United States Patent [19]

Dias et al.

[11] Patent Number: 4,862,454
[45] Date of Patent: Aug. 29, 1989

[54] SWITCHING METHOD FOR MULTISTAGE INTERCONNECTION NETWORKS WITH HOT SPOT TRAFFIC

[75] Inventors: Daniel M. Dias, Mahopac; Manoj Kumar, Yorktown Heights, both of N.Y.

[73] Assignee: International Business Machines Corporation, Armonk, N.Y.

[21] Appl. No.: 219,960

[22] Filed: Jul. 15, 1988

[51] Int. Cl.[4] .............................................. H04J 3/26
[52] U.S. Cl. .................................... 370/94; 370/60
[58] Field of Search ............................ 370/94, 60, 58

[56] References Cited

U.S. PATENT DOCUMENTS

| | | | |
|---|---|---|---|
| 4,449,182 | 5/1984 | Rubinson et al. | 364/200 |
| 4,475,192 | 10/1984 | Fernow et al. | 370/94 |
| 4,494,230 | 1/1985 | Turner | 370/60 |
| 4,500,990 | 2/1985 | Akashi | 370/85 |
| 4,551,833 | 11/1985 | Turner | 370/60 |
| 4,556,972 | 12/1985 | Chan et al. | 370/60 |
| 4,607,363 | 8/1986 | Platel et al. | 370/94 |
| 4,727,537 | 2/1988 | Nichols | 370/94 |
| 4,769,811 | 9/1988 | Eckberg et al. | 370/94 |

*Primary Examiner*—Douglas W. Olms
*Attorney, Agent, or Firm*—Ratner & Prestia

[57] ABSTRACT

A method of switching data packets through a multistage interconnection network (MIN), to prevent hot spot traffic from degrading uniform traffic performance. Each of the address bits in each packet determine the output link at each particular stage of the network to which the packet must be routed. A packet is accepted at an input buffer of the stage only if an acceptance test is met. This acceptance test depends not only on the availability of a buffer at the input buffer at a stage of the network, but also on how the address bits of the packet are related to address bits of other packets in the buffer, and on the stage of the network. If the acceptance test is not met, the packet is retained in the previous stage of the MIN, and is moved to the rear of a queue of packets in the buffer at that stage, or given a lower priority in the queue.

6 Claims, 7 Drawing Sheets

SWITCHING METHOD FOR MULTISTAGE INTERCONNECTION NETWORKS WITH HOT SPOT TRAFFIC

BACKGROUND OF THE INVENTION

1. Field of the Invention

This invention relates generally to a method of switching data packets over a multistage interconnection network (MIN). More particularly, this invention relates to a method of switching data packets over the MIN with distributed control. Such method ensures that heavy traffic to one or a set of destinations (hot spot traffic) can be supported with little degradation to the uniform traffic directed to other destinations of the network. Each of the address bits in each packet determines the route of the packet at a particular stage of the network and packets are at a stage of the buffer of criteria of the address bits of packets currently in the buffer, and on the availability of the buffer.

2. Description of Prior Art

As the requirements for computing power grow, the interconnection of a plurality of processors to support the computing requirements becomes increasingly important. Thus, there is a need for a high-speed network for connecting processors to processors, or processors to a shared memory.

Many networks for interconnecting processors to memories are known. Of these networks, MINs are particularly attractive since they provide high bandwidth, can be modularly increased in size by adding stages to the network, and have O(N log N) complexity where N is the number of processors or memory modules. Most importantly, MINs can be controlled using a distributed algorithm without the bottleneck that occurs in networks having a centralized controller.

A serious problem which occurs when MINs are used for processor memory interconnection is tree saturation. This problem is described in Pfister, "Hot Spot Contention and Combining in Multistage Interconnection Networks," IEEE Transactions on Computers, C-34(10) October 1985, pp. 943-948. When the traffic of data packets is transmitted uniformly to the various memory units within the network, this problem does not occur. However, when there is heavy traffic from the processors to a specific memory, called a hot spot, buffers leading to the hot spot fill with packets addressed to the hot spot. These full buffers block traffic from processors to other memories thus bringing the entire network to a halt.

In Pfister, a method called combining is disclosed to alleviate tree saturation. However, non-combinable, non-uniform data access patterns can occur due to (1) particular array access patterns, (2) non-combinable updates to a hot spot, or (3) transient heavy-load to a memory unit rather than to a specific data item. Furthermore, combining may not be feasible for use in a system without shared memory.

MINs have been proposed for telecommunications packet switching. See for example, Turner, U.S. Pat. No. 4,494,230, as well as U.S. Pat. No. 4,491,945 which teach the use of MINs for telecommunication packet switching. Nonuniformities in traffic in such networks produce similar choking of these networks when tree saturation occurs due to heavy non-uniform traffic of packets to a destination in the network. Combining does not work in this application either.

Akashi, U.S. Pat. No. 4,500,990, describes how a buffer overflow signal can be generated in a CSMA/CD network, causing a packet to be retransmitted to a full buffer. This method is specific to the CSMA/CD (Ethernet type) local area network and is not useful in MINs.

Servel, U.S. Pat. No. 4,603,416, describes a switching method in which packets arriving on input links in bit serial fashion are converted to packet parallel form, time slot interchanged in this parallel form, and finally reconverted to bit serial form. Internally, one packet is transmitted at a time, in 128 bit parallel form. The switch is organized as a single stage. The memory is similar to a time slot interchanger and packets are stored in memory modules as they arrive. The packets are then read out from memory at the correct time to feed them to the output lines. This switching method is not useful for solving hot spot problems in MINs.

Chan, U.S. Pat. No. 4,556,972, teaches an interface of a packet switch to a circuit switch in which the number of links allocated to a destination, from the packet switch through the circuit switch, is dynamically controlled and is based on the volume of packet traffic to that destination. A method for monitoring the delay of packets through a packet switch is described in Turner, U.S. Pat. No. 4,551,833.

And finally a method for providing synchronization between a host computer system and several device controllers is taught in Rubinson, U.S. Pat. No. 4,449,182. Each processor operates at its own speed without creating race conditions and eliminates the need for hardware interlock capability on the I/O bus.

SUMMARY OF THE INVENTION

In the presence of a hot spot, all buffers through which packets originating at some processor and addressed to the hot spot must pass, fill with packets directed to the hot spot. This causes tree saturation. To prevent tree saturation, packets addressed to the hot spot are prevented from filling any buffer. This is accomplished by comparing the address of an incoming packet being moved with the addresses of packets already in a buffer. A packet is not accepted for entry into the buffer if the switch buffer already contains a packet directed to the same unit as the incoming packet. If a packet is not accepted, it is moved to the end of the packet queue in its current buffer to allow other packets to be forwarded.

Operating the switch in this mode prevents a chain of buffers leading to the hot spot from being filled with multiple packets directed to the same hot spot, because in any buffer there can be at most one packet directed to the hot spot. In addition, uniform traffic is not choked because packets detected as potential hot spot traffic are moved to the tail of the queue, thus allowing uniform traffic to move through.

Each switch in the network operates as follows: At the start of a clock cycle, packets at each switch input queue are selected for forwarding. If two packets at the head of the queue are directed to the same output, one of them is selected by an arbitration scheme. Selected packets are simultaneously forwarded to the next stage where they are temporarily held in a buffer. If the next stage buffer is full, or contains a packet directed to the same destination as the incoming packet, then a negative acknowledgment is sent to the previous stage and the packet is moved to the tail of that previous stage buffer. Otherwise, the packet is placed in the next stage buffer and deleted from the previous stage buffer.

DETAILED DESCRIPTION OF THE INVENTION

Figure 1:
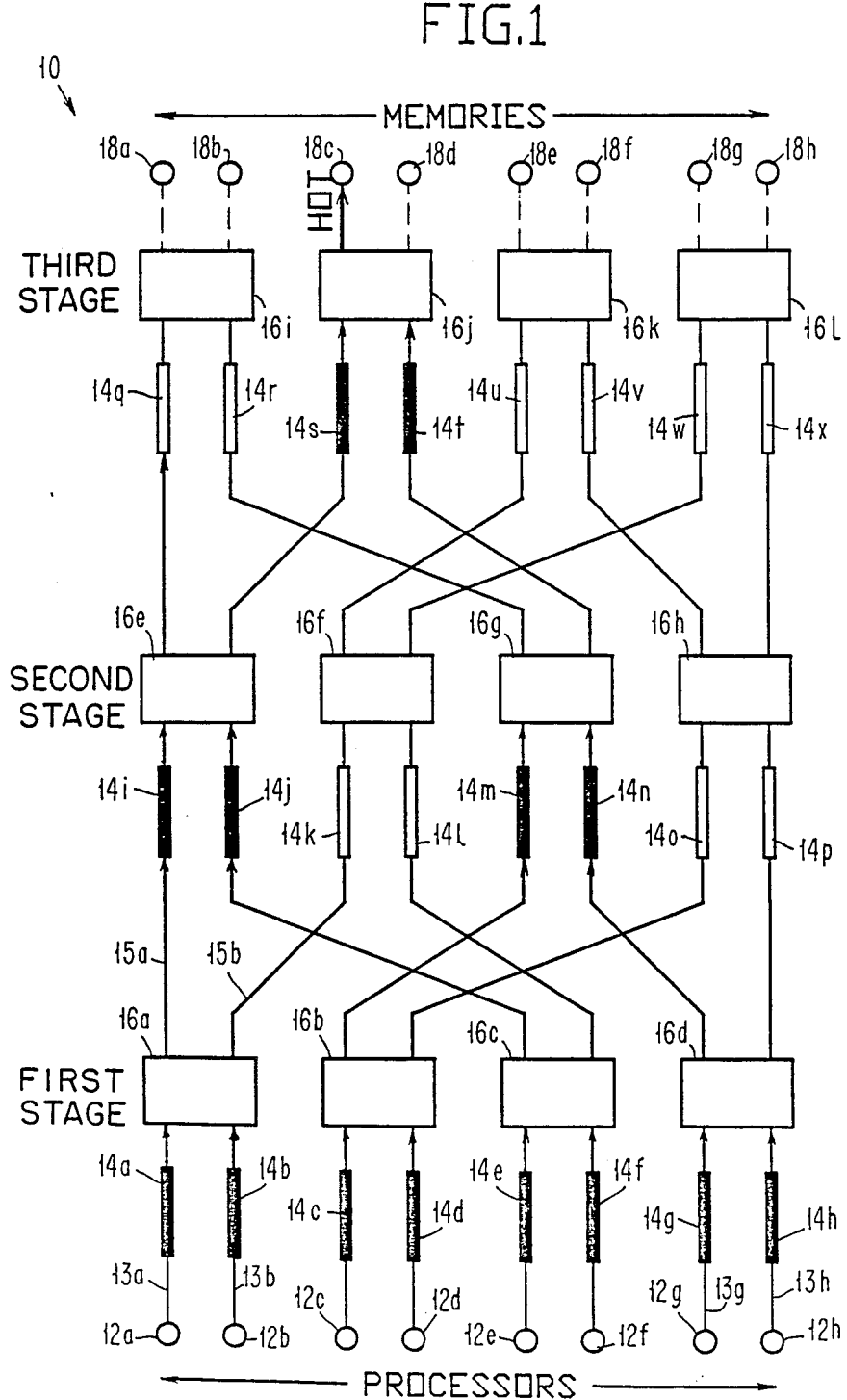
FIG. 1 is a schematic of a typical three stage MIN used in the present invention.

Referring now to FIG. 1, there is shown a block diagram of a typical three stage MIN 10 of the present invention. MIN 10 is a multiprocessor computer system including processors 12a–h which communicate with memory units 18a–h by way of switches 16a–l and buffer stores 14a–x. Those skilled in the art will appreciate that the present invention can be readily adapted for use with an arbitrary number of stages. Processors 12a–h each originate and transmit packets of data to a respective buffer store 14a–h by way of a respective buffer input line 13a–h. Packets of data thus received by buffer stores 14a–h are then transmitted through MIN 10 to memory units 18a–h. In FIG. 1, some reference characters have been omitted for purposes of simplicity.

MIN 10 is organized as a plurality of stages, each stage including a plurality of two input, two output switches 16a–l. The first stage of MIN 10 includes switches 16a–d, the second stage includes switches 16e–h, and the third stage includes switches 16i–l. While four two-input, two-output switches are thus shown in each stage of MIN 10, it will be understood by those skilled in the art that MIN 10 may include switches having N-input, M-output and other interconnection patterns. The interconnection pattern between stages of MIN 10 is a conventional shuffle-exchange pattern which is well known to those skilled in the art.

Each switch 16a–l is provided with two respective buffer stores 14a–x, each of the respective buffer stores of a switch having its own queue of packets addressed to various memory units 18a–h. A processor 12a–h places a packet directed to a memory unit 18a–h into the queue of a respective one of the buffer stores 14a–h of a first stage switch 16a–d as previously described. The packet contains the address of a memory unit 18a–h to which the packet is being sent by one of the originating processors 12a–h. The address within the packet is used by switches 16a–l to route the packet from an originating processor 12a–h through MIN 10 to one of the destination memory units 18a–h.

When processors 12a–h originate packets which are uniformly addressed to memory units 18a–h, the traffic through MIN 10 is uniform. However, when the packets addressed for memory units 18a–h are disproportionately addressed to a particular memory unit 18a–h, the destination memory unit 18a–h to which a disproportionately large number of packets are addressed is a hot spot. Paths through MIN 10 leading to the hot spot may become clogged leading to tree saturation. Traffic destined to memory units 18a–h other than the hot spot may then be blocked if it also must pass through a clogged path.

For example, packets from processors 12a–h may be disproportionately addressed to memory 18c causing buffer stores 14s,t to become full, as indicated in FIG. 1 by a darkening of buffer stores 14s,t. No other buffer stores in the third stage of MIN 10 lead to hot spot memory unit 18c and thus no other buffer stores in the third stage of MIN 10 are filled by the traffic to hot spot memory 18c. However, in the second stage of MIN 10, buffer stores 14i,j,m,n all lead to hot spot memory 18c as indicated. Buffer stores 14i,j lead to buffer store 14s and buffer stores 14m,n lead to buffer store 14t. Thus the queues of buffer stores 14i,j,m,n may all fill up with traffic to hot spot memory unit 18c and packets destined for memory locations other than memory unit 18c which must pass through buffer stores 14i,j,m,n may be delayed.

In the first stage of MIN 10, all the buffer stores 14a–h may fill up with packets addressed to memory unit 18c since all first stage buffer stores 14a–h lead to one of the second stage buffers 14i,j,m,n which are in a path to a hot spot memory unit 18c. Thus, the queues of all first stage buffer stores 14a–h may fill with hot spot traffic and all of MIN 10 traffic may be choked off.

To prevent this tree saturation problem, in the method of the present invention, packets within MIN 10 addressed to any hot spot memory units 18a–h are prevented from filling any buffer store 16a–l by comparing the address of a packet being forwarded with the addresses of all the packets already in the receiving buffer store 14a–x and performing an acceptance test based upon this comparison. Specifically, a receiving buffer store 14a–x does not accept the forwarded packet if that receiving buffer store already contains a packet directed to the same destination as the forwarded packet. This prevents a chain of buffer stores 14a–x leading to a particular hot spot memory unit 18a–h from being filled because in any buffer store there can be at most one packet directed to a hot spot memory unit.

Thus at the start of a clock cycle, packets at the head of each buffer store are selected for forwarding to a buffer store in a following stage of MIN 10. If two packets are addressed to the same switch output, one of them is dropped, and the other is forwarded. At the following stage, any incoming packet is held in a temporary incoming packet buffer (for example, incoming packet buffer 116a, FIG. 2) and the acceptance test is performed. If the next stage buffer store contains a packet directed to the same destination as the forwarded packet, then a negative acknowledge signal (NACK) is sent to the previous stage. The packet is then moved to the tail of the queue of the previous stage buffer store. Otherwise, the packet is placed in a next stage buffer store and deleted from the previous stage buffer store.

At each stage of MIN 10, one bit of an address field within the packet containing the address of an individual destination memory unit 18a–h is used by switches 16a–l to route the packet during each clock cycle. This routing within switches 16a–l is accomplished by determining which of the two output ports of switch 16a–l is to be used to forward the packet to the next stage of MIN 10 in accordance with the aforementioned bit in the address field of the packet. At each stage of MIN 10, the bit of the destination address that is used to route the packet is thus the routing bit.

If two packets require routing to the same output port of an individual switch 16a-l during the same clock cycle, a conflict occurs. One of the conflicting packets is selected in a round-robin manner. However, it will be understood by those skilled in the art that other methods of selecting a packet from a conflicting pair of packets may be used, such as a random selection.

Figure 2:
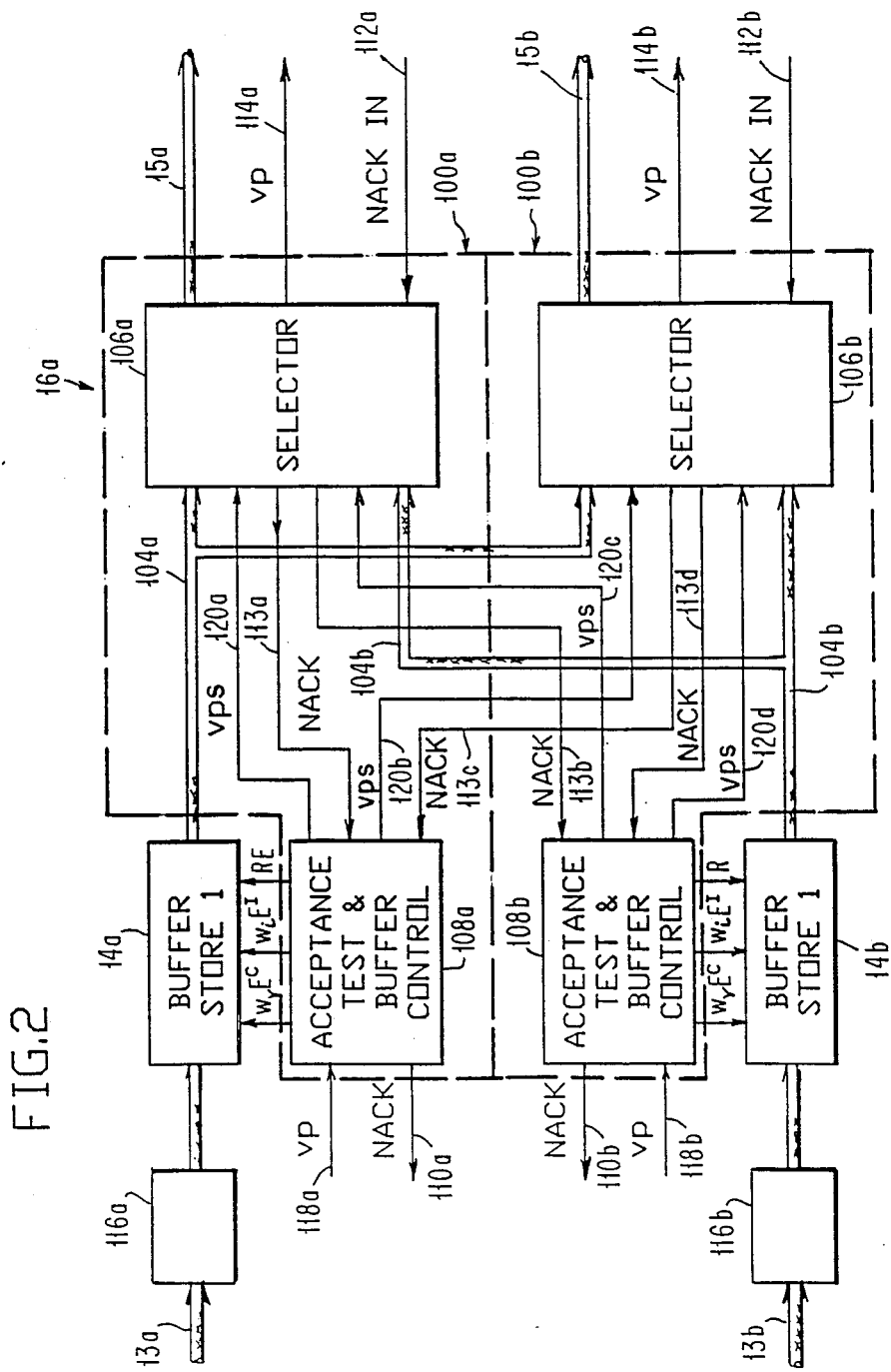
FIG. 2 is a schematic of one of the switches, with associated buffer stores, within the MIN of FIG. 1.

Referring now to FIG. 2, there is shown a block diagram representation of switch 16a and buffer store 14a. While the detailed structure and function of switch 16a and buffer store 14a is set forth, it will be understood by those skilled in the art that this description applies equally well to each of switches 16a-l and buffers 14a-x within MIN 10.

Switch 16a includes two subswitches 100a,b. Subswitches 100a,b within switch 16a receive data packets from processors 12a,b by way of input data lines 13a,b respectively, incoming packet buffers 116a,b respectively, and buffer stores 14a,b respectively. A packet received by subswitch 100a by way of input data line 13a may be applied to either output data line 15a of subswitch 100a or to output data line 15b of sub-switch 100b depending on the routing bit of the packet. Likewise, a packet received by subswitch 100b by way of data line 13b may be applied to output data line 15a or output data line 15b depending on the routing bit of the received packet.

At the first stage of MIN 10, data packets from processors 12a,b to be sent to any memory unit 18a-h are placed into respective incoming packet buffers 116a,b. A packet thus placed in incoming packet buffer 116a for example is compared with packets previously received by subswitch 100a and stored in the queue within buffer store 14a of subswitch 100a. The comparison between a newly received packet and the packets already stored in this queue is performed within acceptance test and buffer control module 108a. A similar operation occurs in subswitch 100b.

Respective negative acknowledge (NACK) lines 110a,b are provided for each acceptance test module 108a,b. Lines 110a,b are respectively coupled to the previous stage of MIN 10 which forwarded the newly received packet or to a processor 12a-h originating a packet. In the case of switch 16a, lines 110a,b are applied to processors 12a,b respectively. If acceptance tester 108a or acceptance tester 108b determines that a packet placed in incoming packet buffer 116a or incoming packet buffer 116b respectively is to be accepted, line 110a or line 110b is accordingly set to a logic level zero. If acceptance tester 108a or acceptance tester 108b determines that the packet arriving at incoming packet buffer 116a or incoming packet buffer 116b respectively is to be rejected, line 110a or line 110b respectively is accordingly set to logic level one.

Each subswitch 100a,b is also provided with a respective selector 106a,b. Each selector 106a,b within subswitches 100a,b is coupled to both buffer stores 14a,b. For example, selector 106a is coupled to both buffer store 14a and to buffer store 14b while selector 106b is coupled to both buffer store 14a and to buffer store 14b. Thus a packet in either queue may be routed by way of either subswitch 100a,b and the packet at the head of each buffer store 14a,b may be presented to either selector 106a,b, depending on the routing bits of each packet.

If both routing bits are one, both packets are presented to selector 106b. If both routing bits are zero, both packets are presented to selector 106a. Thus, if buffer stores 14a,b have at their heads packets having the same routing bit and both present a packet to the same one of selectors 106a,b during the same cycle, a conflict occurs. One of the two packets presented to one of the selectors 106a,b having a conflict is selected by that selector for forwarding to buffer store 14i or buffer store 14k of the next stage by round-robin arbitration. In the case of switches 16i-l of the third stage, this selection process selects a packet for forwarding to one of the memory units 18a-h rather than to one of the buffer stores 14a-x.

If the next stage of MIN 10 (second stage) accepts the packet applied to line 15a or line 15b by selectors 106a,b, respectively, a logic level zero is received on respective negative acknowledge lines 112a,b from switches 16e,f of the second stage. If the packet is rejected by the second stage, a logic level one is received on respective negative acknowledge lines 112a,b. A negative acknowledge signal received by selector 106a on line 112a is relayed from selector 106a, to either acceptance tester 108a by way of line 113a, or to acceptance tester 108b by way of line 113b, according to whether selector 106a selects the packet from buffer 14a or 14b. A negative acknowledge signal received by selector 106b on line 112b is similarly relayed to acceptance test 108b by way of line 113d, or to acceptance tester 108a by way of line 113c. If either acceptance test 108a,b receive a negative acknowledge signal of logic level "0" indicating the packet was accepted, the packet is deleted from buffer store 14a,b, whichever forwarded it.

Figure 3:
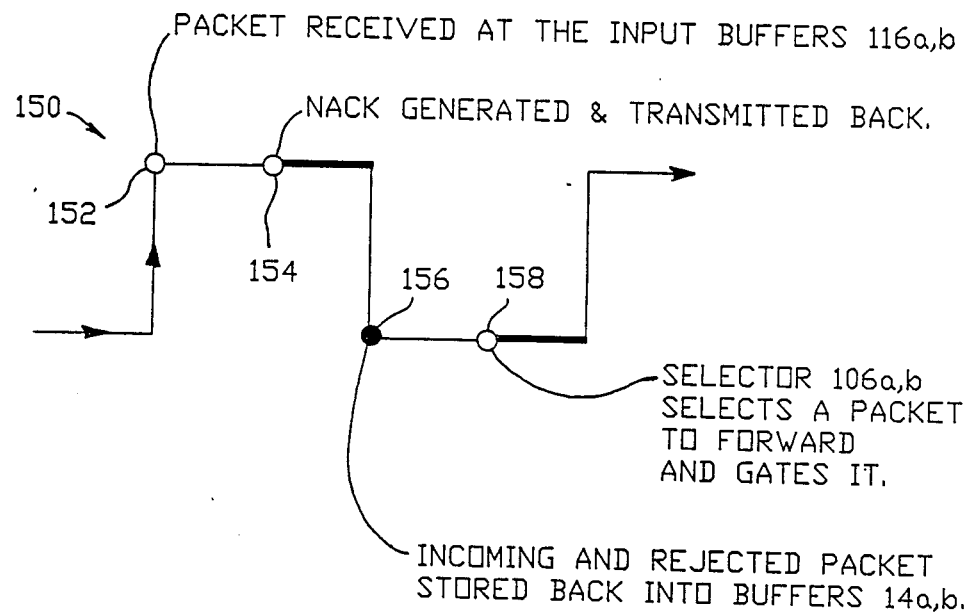
FIG. 3 is a timing diagram showing the events that occur in a clock cycle of the MIN of FIG. 1.

Referring now to FIG. 3, there is shown clock cycle 150. While MIN 10 is synchronized by a single clock signal, it will be understood by those skilled in the art that the method of the present invention may be used in systems having more than one clock and with systems having asynchronous operation.

At time 152 on the rising edge of clock cycle 150, a packet from processors 18a,b may be clocked into incoming packet buffers 116a,b respectively. Likewise, packets from a previous stage within MIN 10 may be clocked into respective incoming packet buffers for the second and third stages of MIN 10. The received packet is combinatorially compared by acceptance tester 108a or acceptance tester 108b with the contents of the buffer stores 102a,b depending on the subswitch 100a,b to which the packet is forwarded. A negative acknowledge signal is generated and transmitted back to the previous stage of MIN 10 at time 154. At time 156, the state of buffer store 14a,b is changed to reflect the acceptance or rejection of the incoming packet by the next stage. For example, if the forwarded packet was accepted at time 154, the next packet is at the head of the buffer store queue at time 156.

After time 156, the new packets at the head of buffer queues within buffer stores 14a,b are selected by selector 106a or selector 106b if necessary and applied to the incoming packet buffers of the following stage. At the start of the next clock cycle 150 within MIN 10, packets presented at the inputs of switches 16a-l are gated into the next stage.

While clock cycle 150 is shown with a single half cycle for forwarding a packet between stages, it will be understood by those skilled in the art that this design may be readily adapted to multiple sub-cycles for forwarding long packets between stages of MIN 10. Furthermore, it will be understood that while the rising edge of clock cycle 150 is shown as the start of the cycle, any point within clock cycle 150 may be so designated.

Figure 4:
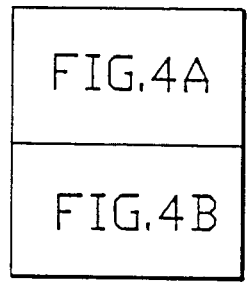
FIG. 4 comprises FIGS. 4A and 4B which taken together are more detailed schematics of a subswitch within a switch of FIG. 2.
Figure 4A:
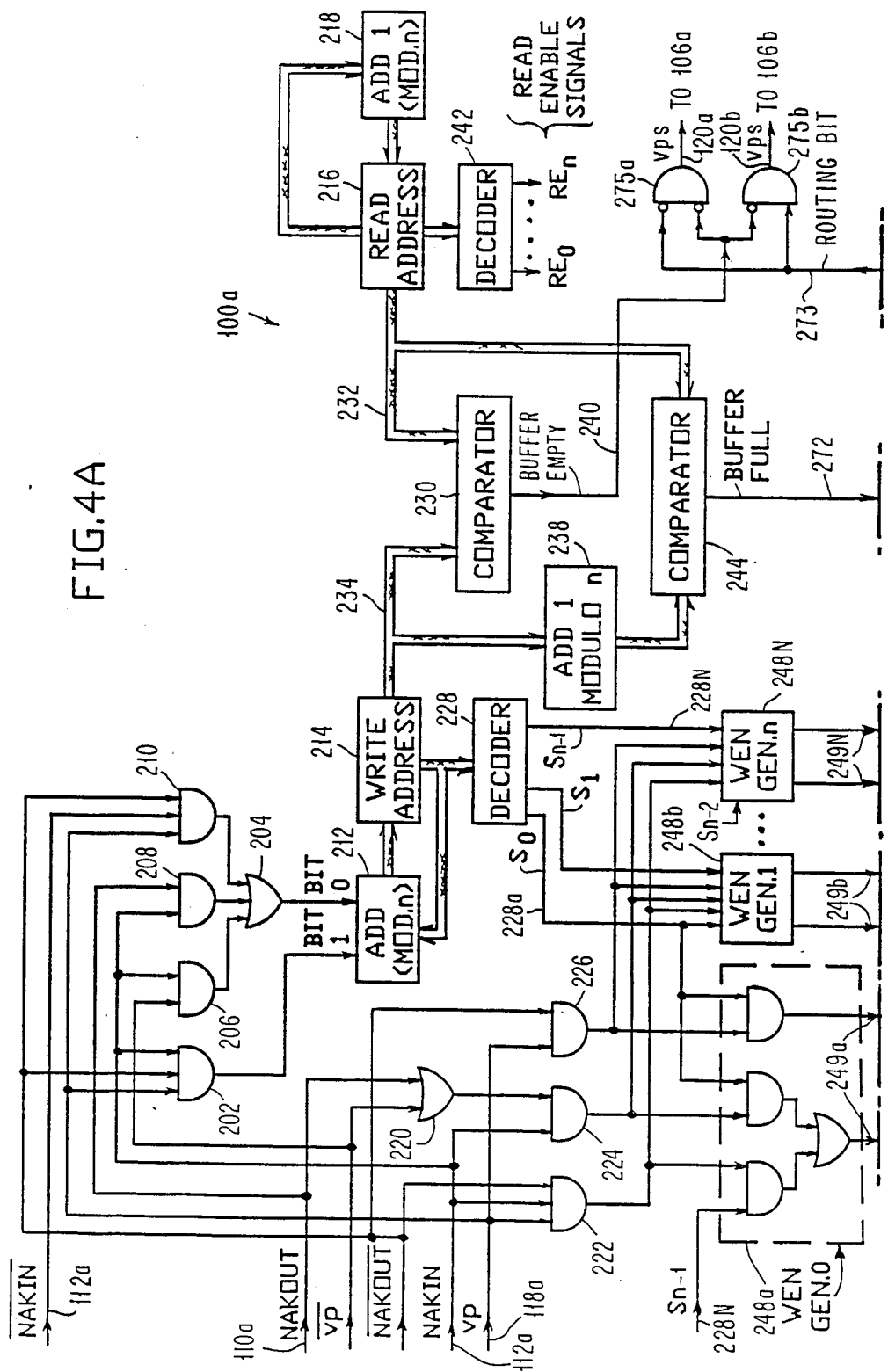

Referring now to FIGS. 4A,B, there is shown subswitch 100a in more detail. Two subswitches 100a,b, are included within each switch 16a–l as previously described with respect to FIG. 2 and it will be understood that the function of subswitch 100b is symmetrical to that of subswitch 100a.

Figure 4B:
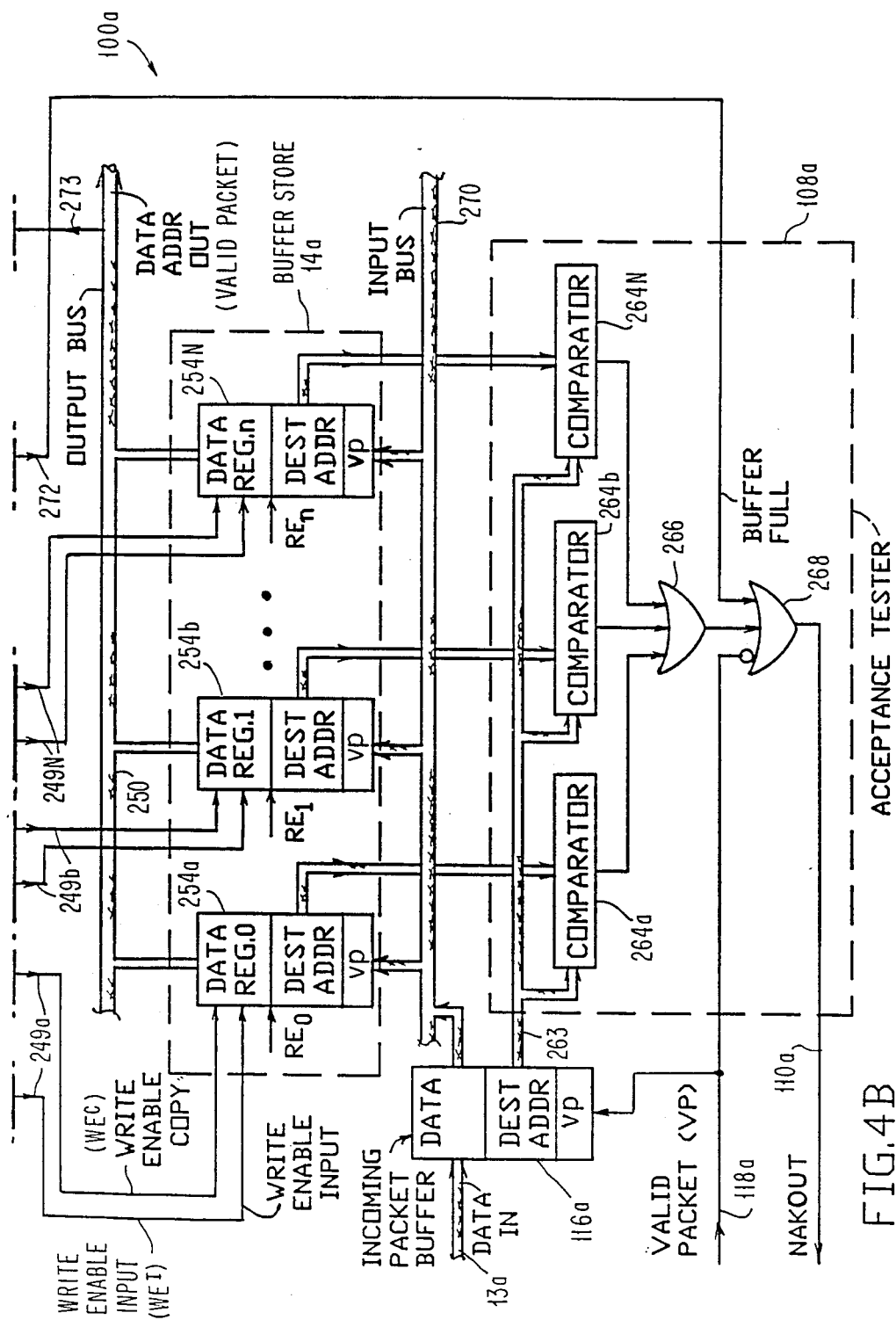

Packet arrives at subswitch 100a by way of line 13a (FIG. 4B) and is stored in incoming packet buffer 116a. A decision is then made whether to accept the packet thus received as previously described. Thus, incoming packet buffer 116a applies the destination address of the packet to acceptance tester 108a by way of bus 263 for comparison with the destination address of every packet stored within the queue of buffer store 14a. Each packet in the queue of buffer store 14a is stored within an individual data register 254a–N. Thus the queue of buffer 14a comprises the pockets stored in data registers 254a–N. The contents of each data register 254a–N is simultaneously compared with the new packet in a separate comparator 264a–N.

The output of each comparator 264a–N is ORed in OR-gate 266. If the output of OR-gate 266 goes high then the address of the incoming packet matches one of the packets in registers 254a–N of buffer store 14a. The output of OR-gate 266 is then applied to OR gate 268 along with a buffer full signal on line 272 and a valid packet signal on line 118a to provide a negative acknowledge out (NAKOUT) signal on line 110a. The buffer full signal of line 272 is provided by comparator 244 (FIG. 4A) by comparing the next read address with the next write address plus one modulo-n from adder 238 and is applied to OR gate 268 to prevent an attempt to put another packet into buffer store 14a when buffer store 14a is full. This permits both a buffer-full test, the result of which is on line 272, and a separate acceptance test, the result of which is at the output of gate 266, to be performed before a packet is accepted. Thus, the output of OR gate 268 on line 110a indicates whether the packet is accepted or not based upon both whether buffer store 14a has room and whether the new packet is directed to the same individual memory unit 18a–h as packets already in buffer store 14a.

Data registers 254a–N of buffer store 14a are applied to output bus 250 as well as to comparators 264a–N. Packets from data registers 254a–N are applied, one at a time, to output bus 250 for transmission to the next stage within MIN 10 or to a memory unit 18a–h. One data register 254a–N of the queue is therefore selected according to the control logic of subswitch 100a and the selected register 254a–N is read from buffer store 14a for forwarding to the next stage of MIN 10. The routing bit of the packet being forwarded is coupled by way of line 273, from output bus 250 to gates 275a,b to provide valid packet signals (VPS) on lines 120a and 120b respectively to selectors 106a,b. In this way, one of the selectors 106a,b is selected, thereby routing the packet.

During each cycle 150 of MIN 10, adder 218 is incremented in order to select a packet from a data register 254a–N of buffer store 14a. Adder 218 is a modulo-n adder where n is the number of data registers 254a–N within buffer store 14a. The output of adder 218 is then applied to read address 216. The address output of read address 216 is applied to decoder 242 which provides a logic level on one of n read enable (RE) output lines. The read enable lines of decoder 242 are individually applied to a respective one of data registers 254a–n. Thus the read enable output lines of decoder 254 each select one of n data registers 254a–N to enable the selected data registers 254a–N to be read and its contents applied to output bus 250 for transmission to the next stage of MIN 10.

The determination of which data register 254a–N is written with a new packet from input bus 270 for storing a new packet in buffer store 14a is more complicated than the determination of which register 254a–N is read for output bus 250. The address within buffer store 14a of the data register 254a–N within buffer store 14a which receives the new packet is determined by write address 214.

The output of write address 214 is applied to decoder 228 to produce signals for corresponding write enable generators 248a–N on lines 228a–N. Each write enable generator 248a–N is provided with a pair of lines 249a–N for selecting a register 254a–N to be written. Within each write enable generator 248a–N the output of decoder 228 is combined with (1) the valid incoming packet signal of line 118a, (2) the negative acknowledge in (NAKAN) signal of line 112a and (3) the negative acknowledge signal out (NAKOUT) of line 110a. These are combined by logic gates 220, 222, 224 and 226 to produce an enable signal within a write enable generator 248a–N to copy the incoming bus 270 into the selected register 254a–N. Thus, if there is a valid incoming packet, it is placed in a selected write enable register 254a–N.

Modulo-n adder 212 causes the write address to be (1) incremented by one if either a packet comes in and a packet is read out of buffer store 14a or if no packet comes in and no packet goes out of buffer store 14a, (2) incremented by two if a packet comes in and no packet goes out of buffer store 14a, and (3) not incremented if no packet comes in and a packet is read out of buffer store 14a. The signals necessary to make these determinations are on lines 110a, 112a, 118a and the logic operations are performed by logic gates 202, 204, 206, 208, 210.

If a packet at the head of the queue of buffer store 14a is rejected in the arbitration performed by selectors 106a,b or by the next stage of MIN 10, then it is placed at the end of the queue of buffer store 14a behind any incoming packet. This packet is available on output bus 250 and if the negative acknowledge signal of line 112a is high, it is copied to the correct register 254a–N. The logic of subswitch 100a thus creates an enable signal at the write address if the outgoing packet is negative acknowledged and no incoming packet comes in.

Otherwise it copies it to the register corresponding to the write address plus one modulo-n where n is the number of registers 254a–N.

Figure 5:
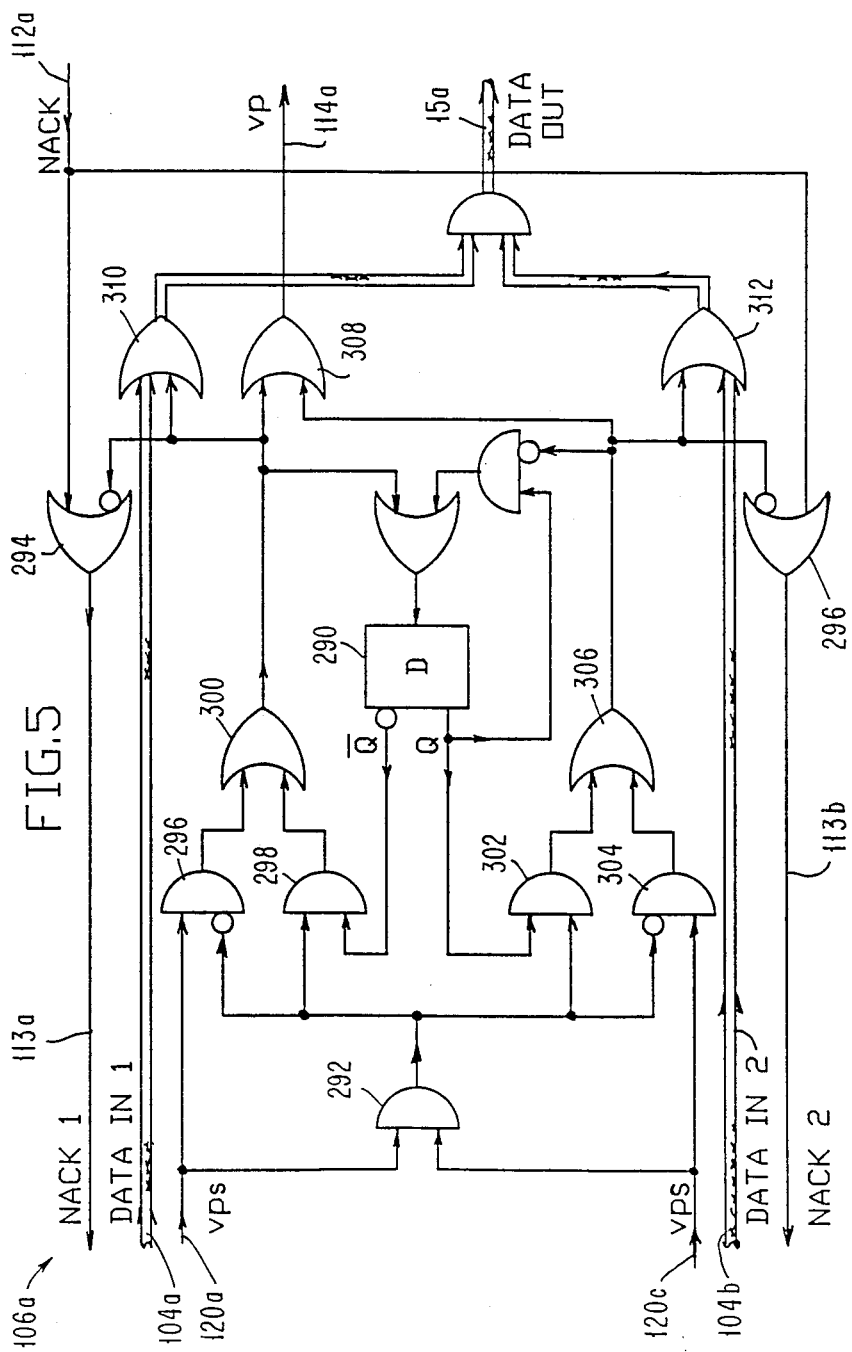
FIG. 5 is a detailed schematic of a selector circuit within a subswitch of a switch of FIG. 2.

Referring now to FIG. 5, there is shown in detail selector 106a within subswitch 100a. Since selectors 106 a,b are identical only one of them will be described in detail. Selector 106a may have two inputs, a first input (DATA IN 1) by way of data line 104a which provides a packet from buffer store 14a as well as a second input (DATA IN 2) by way of data line 104b which provides a packet from buffer store 14b. As previously described, selector 106a must arbitrate if data is provided by way of both data lines 104a,b during a single clock cycle.

The arbitration scheme shown is a round-robin scheme wherein data is selected from one data line 104a,b during one arbitration and from the other data line 104a,b during the next arbitration. As previously described, other methods, such as a random selection method, may also be used. If there is only one input to selector 106a during a clock cycle rather than two inputs, that one input is applied to data out line 15a and there is no need for selection or arbitration by selector 106a.

Rerouting bit of each packet determines which selector 106a,b forwards a packet. This routing bit is ANDed (as in gates 275a and 275b for subswitch 100a in FIG. 4A) with the valid packet bit of the buffer store 14a or 14b on line 273 to produce the VPS signals of lines 120a,b, c and d. Thus, for example, if buffer store 14a provides a valid packet having a routing bit for selector 106a, then the selector level VPS on line 120a of selector 106a is true. Likewise, if buffer store 14b forwards a packet to selector 106a, the level VPS on line 120c of selector 106a is true. Similarly, with particular reference to FIG. 2, if buffer store 14a provides a valid packet having a routing bit for selector 106b, then the selector level VPS on line 120b of selector 106b is true. If buffer store 14b forwards a packet to selector 106b, VPS on line 120d of selector 106b is true.

When a packet is forwarded from selector 106a by way of line 15a, a valid packet signal is provided for the next stage on line 114a. The level on line 114a is provided by gate 308 which receives a high input from either gate 300 or gate 306 depending on whether line 120a or line 120c was high. Thus, whether the valid packet level VPS is received by way of line 120a or line 120c indicating a valid packet from either buffer store 14a or buffer store 14b, the valid packet signal VP may still go high at line 114a.

As previously described, if just one line 120a,c is high indicating just one packet is applied to selector 106a, that one packet is forwarded by way of line 15a. Gate 292, as well as the logic of gates 296, 298, 300, logic of gates 302, 304, 306 provide the high level on valid packet line 114a when just one packet is advanced as well as opening either gate 310 or gate 312 to forward the packet received on bus 104a or bus 104b as required. When arbitration must be performed, the round-robin method is executed by flip-flop 290 which causes alternately high levels at the output of gate 300 or gate 306 to thereby open either gate 310 or 312. During the next arbitration, the state of flip-flop 290 is inverted causing the opposite data bus 104a,b to be selected.

When data forwarded from selector 106a by way of bus 15a is accepted by a later stage, the later stage provides a negative acknowledge back to selector 106a by way of negative acknowledge line 112a. However, the packet forwarded may have come from either buffer store 14a or buffer store 14b and the negative acknowledge signal must be routed to the correct buffer store 14a,b in order for that buffer store to cancel the data packet from its queue and in order to prevent the other buffer store 14a,b from cancelling anything from its queue. Thus, two negative acknowledge lines 113a,b are provided. Negative acknowledge line 113a is applied to buffer store 14a by way of acceptance test 108a and negative acknowledge line 113b is applied to buffer store 14b by way of acceptance test 108b.

To gate the negative acknowledge signal of line 112a to the correct negative acknowledge line 113a,b, the two inputs of gate 308 are applied to separate gates 294, 296. As previously described, one or the other of these two inputs on gate 308 goes high depending on which buffer store 14a,b forwarded the packet. These two inputs therefore gate the signal of negative acknowledge line 112a onto one of negative acknowledge lines 113a,b by way of gates 294, 296.

Figure 6:
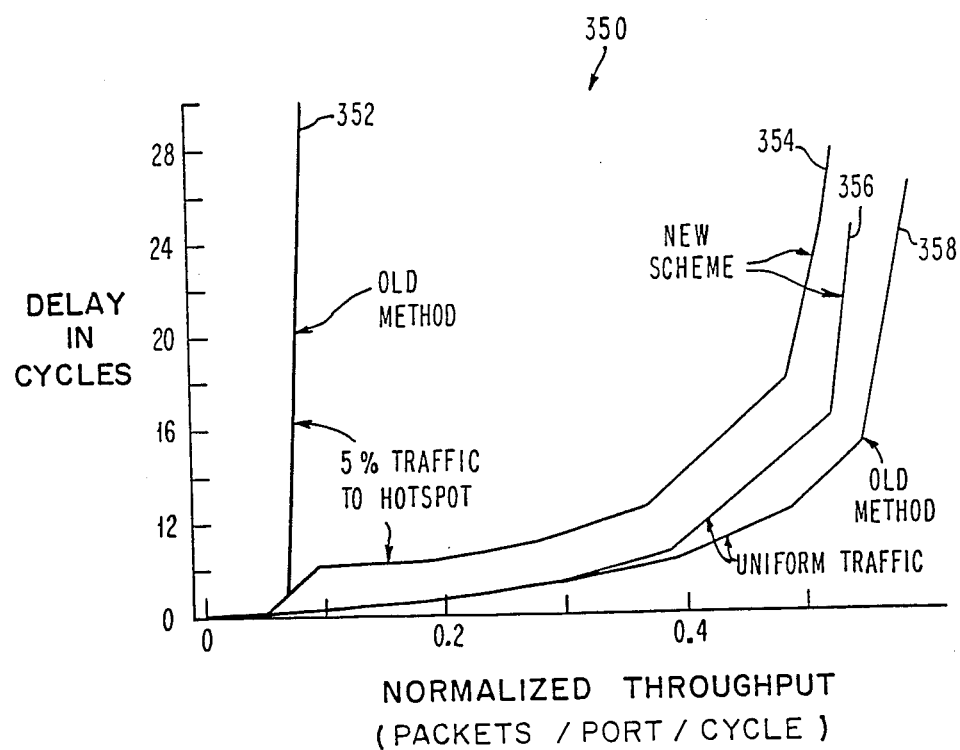
FIG. 6 is a graph showing the throughput versus loading characteristic of a MIN using both a prior art method and the method of the present invention.

Referring now to FIG. 6, there is shown graph 350 showing the relation between the delay in cycles for MIN 10 and the throughput of MIN 10, (1) using the method of the present invention and (2) a prior art method not using the method of the present invention wherein packets were accepted by buffers 14a-x even though buffers 14a-x may already have other packets with the same destination. The data illustrated on graph 350 was gathered on a 256×256 port network (not shown) having 2×2 subswitches arranged in eight stages. The normalized throughput on the horizontal axis is the ratio of the throughput to the ideal throughput with no collisions in the network wherein the ideal is assumed to be one packet per cycle per port. Data was gathered for uniform traffic and for traffic wherein five percent of the packets were directed to a single hot spot. The buffer length of this system was eight.

The delay in cycles for the prior art method when traffic through the MIN is uniform is set forth in plot 358 wherein the maximum normalized throughput is approximately 0.55 while plot 352 sets forth 0.07 throughput for the prior art method for the five percent hot spot case. Plot 356 shows the delay as a function of throughput using the method of the present invention on uniform traffic. As shown in waveform 356, the method of the present invention performs slightly worse at high throughput than the prior art method for uniform traffic achieving a maximum throughput of approximately 0.50 rather than the 0.55 of waveform 358.

However, the performance of the MIN using the system of the present invention when five percent of the traffic is directed to a hot spot, shows a great improvement over the performance shown in plot 352 as seen in plot 354. Thus the method of the present invention greatly decreases delay and improves performance during non-uniform traffic as shown by the comparison of plot 352, 354, although it degrades performance slightly during uniform traffic as shown in plots 356, 358.

The method of the present invention leads to an entire class of switching algorithms, based on how the contents of buffers 14a-x are used as succeeding stages of MIN 10 in performing arbitration. Some specific alternate embodiments are as follows.

As shown by plots 356,358, uniform traffic is somewhat adversely affected by the basic scheme. This effect is present particularly at later stages of the network because at later stages there is an increased probability that a packet to the same destination is present in the next buffer stage when a packet is to be forwarded. This leads to some unnecessary blocking in the network. One alternate embodiment of the method of the present invention is to check for a packet with the same destination only if the queue at the receiving buffer 14a-x is more than some minimum length. For example, the destination may be checked only if the queue is more than one or two packets long. The reason for choosing such a scheme is that there is typically a smaller load and shorter buffer queue at later stages of MIN 10 where there is a higher probability that a packet bound to the same destination as the incoming packet will occur under normal circumstances.

Data gathered for the first and the alternate embodiments indicate that if the alternate method is performed only for the last few stages of MIN 10 and the first method is used for the first few stages of MIN 10, then network performance with hot spot traffic is about the same as the basic scheme, while retaining the good performance under uniform load.

One reason why the throughput of the network using the basic scheme with hot spot traffic is less than that for uniform loading is that hot-spot packets come to the head of the queue every few cycles, often wasting these cycles. Another alternate embodiment for alleviating this problem is to have a priority bit associated with a packet. A packet may then be assigned a lower priority if it is blocked due to another packet of the same destination being present in the buffer of the next stage.

What is claimed is:

1. A method for switching packets in a multistage interconnection network including a plurality of switching means each having at least one input port and an output port, a buffer coupled to the input port adapted to receive packets from the input port, comprising the steps of:
   (a) detecting an arrival of a packet at the input port;
   (b) determining whether the buffer is full;
   (c) determining as an acceptance test of the packet whether the buffer contains less than a predetermined number of packets directed to a same destination as the packet detected in step (a);
   (d) moving the packet detected in step (a) into the buffer only if the buffer is not full and also the separate acceptance test is met.

2. The method of claim 1 wherein each switching means includes a plurality of buffers, one of each input ports, for receiving and queuing said packets and wherein step (a) further comprises the steps of:
   first, selecting a packet from each buffer of the plurality of buffers;
   determining if more than one selected packet is directed towards a single output port;
   second, selecting one of the commonly directed packets; and,
   forwarding the second selected packet to the input port of a switching means in the next stage.

3. The method of claim 1 wherein the network further includes a plurality of buffers for receiving and queuing said packets, further comprising the step of moving the forwarded packet to a tail of a buffer if the acceptance test is not met and the forwarded packet is not received into the buffer in step (d).

4. The method of claim 1 further comprising the steps of:
   determining the number of packets in the buffer; and
   performing steps (c) and (d) in at least one stage of the multistage system only if the determined number of packets is greater than a predetermined number.

5. The method of claim 3 wherein packets that are moved to the tail of a buffer are given lower priority than that for other packets in the buffer.

6. A method for routing a plurality of packets, each including a destination address, through a multistage interconnection network having a plurality of switching means, each having at least one input port and one output port and a buffer coupled to the input port adapted to receive packets from the input port, comprising the steps of:
   (a) detecting an arrival of a packet at the input port;
   (b) determining whether the buffer is full;
   (c) separately determining whether an acceptance test of the packet is met, wherein the acceptance test is a function of the destination address of the packet detected in step (a), the destination addresses of any packets in the buffer, and the stage of the network;
   (d) moving the packet detected in step (a) into the buffer only if the buffer is not full and also the separate acceptance test is met.

* * * * *